United States Patent [19]

Ciaperoni et al.

[11] 4,209,606

[45] Jun. 24, 1980

[54] SELF-EXTINGUISHING AND THERMOSTABLE COPOLYESTERS AND PROCESS FOR MAKING THE SAME

[75] Inventors: Aldemaro Ciaperoni, Bollate; Giuseppe Quaglia, S.Giorgio su Legnano; Gino Dall'Asta, Milan, all of Italy

[73] Assignee: SNIA VISCOSA Societa Nazionale Industrial Applicazioni Viscosa S.p.A, Milan, Italy

[21] Appl. No.: 878,168

[22] Filed: Feb. 15, 1978

[30] Foreign Application Priority Data

Feb. 15, 1977 [IT] Italy .................. 20278 A/77

[51] Int. Cl.$^2$ .................. C08G 63/66; C08G 63/68
[52] U.S. Cl. .................. 528/167; 260/45.7 PS; 260/45.7 P; 260/45.7 PH; 528/167; 528/173; 528/191
[58] Field of Search .............. 528/167, 169, 173, 191; 260/45.7 PS, 45.7 P, 45.7 PH

[56] References Cited

U.S. PATENT DOCUMENTS

| | | | |
|---|---|---|---|
| 3,794,617 | 2/1974 | Mains et al. | 528/191 |
| 3,873,504 | 3/1975 | Boettcher et al. | 528/173 |
| 3,935,166 | 1/1976 | Kanai et al. | 528/191 |

*Primary Examiner*—Lester L. Lee
*Attorney, Agent, or Firm*—Wenderoth, Lind & Ponack

[57] ABSTRACT

A flame resistant and self-extinguishing copolyester composition is made by copolycondensing a dicarboxylic aromatic acid or its diester, a saturated aliphatic diol, a tetrabrominated diol and a sulphonated aromatic compound, preferably in the presence of a phosphor derivative as a complexing and stabilizing agent. Preferably the acid is terephthalic acid and the saturated diol is ethylene or butylene glycol. The viscosity of the copolyester is from 0.3 to 0.6 dl/g and preferably not less than 0.4 or more preferably 0.45 dl/g and its bromine and sulphur contents are 0.1–12% and 0.05–1% by weight respectively, the phosphor, if any, not exceeding 1%. A marked synergic effect of the concurrent presence of bromine and sulphur is evidenced by combustion tests.

19 Claims, No Drawings

SELF-EXTINGUISHING AND THERMOSTABLE COPOLYESTERS AND PROCESS FOR MAKING THE SAME

BACKGROUND OF THE INVENTION (a) The Field of the Invention

The present invention relates to copolyester compositions having the properties of resisting flame propagation and of being self-extinguishing and thermostable, suitable for the production of flame-resistant formed bodies, in particular textile fibres, and to a process for making the same. Preferably, the copolyester compositions of this invention are essentially based on polyethyleneterephthalate and/or polybutyleneterephthalate.

(b) The Prior Art

Methods for the production of formed bodies, in particular fibres, from copolyesters, that are resistant to flame propagation and/or self-extinguishing, are known in the art. Three techniques are known for imparting to the formed bodies flame-resistance and/or self-extinguishing properties:

(a) the incorporation by extrusion operations of additives which confer such properties, into copolyester compositions;

(b) the use of comonomers which confer such properties in the polymerization;

(c) the application to the previously formed bodies of finishes containing additives which confer such properties.

Techniques (a) and (b) are much preferable to technique (c) for the production of flame-resistant and self-extinguishing copolyester fibres because the application of a finish involves the well known disadvantages that the finish is generally not stable and is progressively removed in the use and washings of the textile articles, and it imparts to the textile articles an inferior hand. Therefore the art is oriented, for the production of self-extinguishing formed bodies, in particular textile articles, to the preparation of essentially polyester compositions which themselves contain one or more self-extinguishing agents.

SUMMARY OF THE INVENTION

The Applicants have now surprisingly found a new process for the preparation of thermostable copolyesters, which are resistant to flame propagation and are self-extinguishing, containing, besides bromine atoms (which are known to confer self-extinguishing properties), also atoms of sulphur, which surprisingly enhance said properties, producing a synergic effect. Further, the copolyesters according to the invention have the important advantage that they can be dyed also with basic dyes, which is not possible in the case of the self-extinguishing polyesters known in the art.

An object of the present invention is therefore a process for making copolyester compositions adapted to the production of formed bodies, in particular fibres, having high thermostability, self-extinguishing properties and/or resistance to flame propagation, characterized in that it comprises the polycondensation —in the presence of a conventional polycondensation catalyst such as a compound of apolyvalent metal, e.g. antimony oxide, germanium oxide, titanium salts, zinc salts, etc. —of the following components:

(A) a compound chosen from the group consisting of dicarboxylic arylic acids and their methyl diesters;

(B) a saturated aliphatic diol;

(C) a tetrabrominated diol having the formula (1):

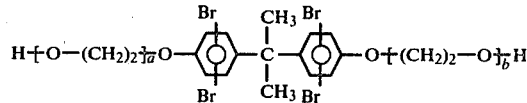

wherein a and b are, independently of one another, chosen among 1 or 2;

(D) a compound having the formula (2):

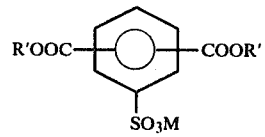

wherein R' represents a hydrogen atom or an alkyl radical containing from 1 to 3 carbon atoms or a hydroxyalkyl radical containing 2 or 3 carbon atoms, and M represents an alkali metal atom; and (E) from 0 to 1% by weight of an organic or inorganic derivative of trivalent or pentavalent phosphor (the percentage being based on the total weight of the monomers A, B, C, D, and E), as complexing and stabilizing agent.

The phosphor derivative, when present, is chosen from the group consisting of phosphorous and phosphoric acids, their salts, preferably alkali metal salts, and their aliphatic or aromatic esters, such as triphenyl phosphate or phosphite or lower alkyl, such as triethyl, phosphate or phosphite.

Preferably, terephthalic acid or its methyl diester is used as component (A) and as component (B) a compound is preferably used having the formula (3):

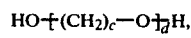

wherein c is 2,3 or 4 and d is 1 or 2.

Also preferably:

in the compound having the formula (1) a and b are 1;

in the compound having the formula (2), M is Na or K and R' is CH$_3$ or CH$_2$CH$_2$OH;

in the compound having the formula (3), c is 2 and d is 1.

According to the invention, the compounds indicated hereinbefore as A, B, C, and D are copolymerized preferably in the presence of E and in the presence of a catalyst, chosen e.g. from Sb$_2$O$_3$ and GeO$_2$, under conditions usual for this type of copolymerization.

The copolymerization is continued until a predetermined viscosity is reached; generally the reaction is stopped when the intrinsic viscosity of the resulting composition is between 0.3 and 0.6 dl/g (measured in a 60/40 by weight mixture of phenol and tetrachloroethane at 20° C.). Preferably the components are used in the following molar ratios: 1 mol of component A, preferably the dimethylester of terephthalic acid; from 1 to 2.5 mols of component B, preferably ethylene glycol; from 0.001 to 0.1 mol of the tetrabrominated product having the formula (1); and from 0.005 to 0.07 mol of the sulphonated derivative having the formula (2). The phosphor derivative, if any, does not exceed 1% by weight of the total and the polycondensation catalysts are present in the amounts conventionally employed for this type of reaction.

A further object of the present invention is the copolyester composition adapted to the production of formed bodies, in particular fibres, having high thermostability, self-extinguishing properties and/or resistance to flame propagation, obtained by the process hereinbefore set forth.

Said composition is a copolyester constituted by the random association of the radicals of the components A, B, C, D and E (if any), preferably in the preferred amounts hereinbefore set forth. More specifically, it is a copolymer the molecule of which is constituted by the random association of a radical of an arylic dicarboxylic acid, preferably a terephthalic acid radical; a radical of a saturated aliphatic diol, preferably a radical of ethylene or butylene glycol; a radical of a tetrabrominated diol having the formula (1) hereinbefore defined; and a radical of a compound having the formula (2) hereinbefore set forth —said radicals constituting at least 99% by weight of the molecule, and the remaining part, if any, being constituted by radicals of phosphor derivatives chosen from the group hereinbefore set forth.

It is to be understood that in principle more than one of each of components A, B, C, D and E can be used and correspondingly the molecule of the resulting copolyester may contain more than one radical of each of said components, in random association.

The copolyester composition according to the invention attains an intrinsic viscosity between 0.3 and 0.6 dl/g in the course of the copolycondensation, as has already been set forth: said intrinsic viscosity however is preferably not lower than 0.4 dl/g and still more preferably not lower than 0.45 dl/g (measured as hereinbefore set forth). The composition maintains this viscosity until it is transformed to formed bodies, in particular fibres, but in the course of said transformation the intrinsic viscosity may be somewhat lowered. While it is preferred that the intrinsic viscosity of the composition in the formed bodies be very close to the original viscosity which it has when in the form of powder, chips or other particles, it may be even significantly lower but it should not be lower, preferably, than 0.35 dl/g and still more preferably should not be lower than 0.4 dl/g (always measured as hereinbefore set forth.)

The contents of elementary bromine and sulphur in the composition according to the invention may be in the ranges 0.1–12% and 0.05–1% by weight of the composition, respectively, while the phosphor derivatives present, if any, do not exceed 1% by weight of the composition.

The concurrent use of compounds having the formula (1) and (2) imparts to the copolyester composition not only improved self-extinguishing and flame resistant properties, but a considerable thermal stability as well. The improved self-extinguishing properties are evidenced by the comparative results of the vertical test according to norm U.S.A. DOC FF 3-71, carried out on articles obtained from compositions according to the invention, on the one hand, and from a conventional polyethylene terephthalate, on the other.

Another empirical but highly significant test which shows the synergic effect of Br and S, consists in determining the number of ignitions necessary for the complete combustion of a twine made up of 100 twisted filaments and having a length of 50 cm: the greater the number of ignitions required, the greater the resistance to the combustion.

Another advantage of the copolyesters according to the present invention is that they can be dyed with basic dyes, which is not possible in the case of the self-extinguishing polyesters known in the art.

The formed bodies, in particular the fibres, filaments and textile articles, obtained from a copolyester composition as defined hereinbefore, also form an object of the present invention.

PREFERRED EMBODIMENTS OF THE INVENTION

In the following illustrative but not limitative examples, the parts are to be understood as parts by weight, unless otherwise indicated.

The intrinsic viscosity which in the following examples is indicated by the symbol $[\eta]$ and is expressed in dl/g, is measured at 20° C. after dissolving the copolyester in a mixture of phenol and tetrachloroethane in a ratio of 60/40 by weight.

EXAMPLE 1

Preparation of a copolyester from dimethylterephthalate, ethylene glycol, 2,2-bis[3,3-dibromo-4(2-hydroxyethoxy)phenyl]propane and 1-sulphobenzene-3,5-dicarboxylic dimethylester monosodium salt, having calculated Br and S contents of 5% and 0.35% respectively.

In an autoclave provided with a stirrer and adapted to the ester interchange reaction for the preparation of the polyethyleneterephthalate from dimethylterephthalate and ethylene glycol, there are introduced at 150° C. and in a nitrogen stream, 150 parts of dimethylterephthalate, 105 parts of ethylene glycol, 16.76 parts of 2,2-bis[3,3-dibromo-4(2-hydroxyethoxy)phenyl] propane (molar ratio 3.4% with respect to the dimethylterephthalate) 5.3 parts of 1-sulphobenzene-3,5-dicarboxylic dimethylester (molar ratio 2.3% with respect to the dimethylterephthalate), 0.112 parts of manganese acetate, 0.6 parts of titanium dioxide and 0.019 parts of potassium acetate. After charging the aforesaid substances, a nitrogen environment is established within the autoclave. The whole is heated under stirring until a temperature of 220° C. has been attained in 185 minutes. During this period 47.9 parts of methyl alcohol (96% of the theory) have distilled. The mixture obtained by ester interchange is transferred to the polycondensation autoclave wherein 0.06 parts of antimony sesquioxide and 0.046 parts of monosodium phosphate are added, always under stirring, at a temperature 245° C. Thereafter a partial and progressive vacuum is applied for 45 minutes; during this period of time the excess ethylene glycol is removed. When the residual pressure in the autoclave reaches 30–50 mmHg, 0.031 parts of phosphorous acid dispersed in a small amount of ethylene glycol are added. After 5–6 hours of stirring at 265° C. and 0.2 mmHg of residual pressure, the copolyester mass containing the bromine and sulphur derivatives is extruded in the course of 30–40′.

The copolymer thus obtained has the following characteristics:

$[\eta]=0.49$ dl/g;
acid groups=41 equivalents/ton;
diethyleneglycol content=2.2% in mols;
Br% found=4.8;
S% found=0.35.

EXAMPLE 2

Preparation of a copolyester as described in Example 1, but having calculated Br and S contents of 3.5% and 0.3% respectively.

In the autoclave described in Example 1, the following products are charged: 150 parts of dimethylterephthalate, 105 parts of ethyleneglycol, 11.3 parts of 2,2-bis[3,3-dibromo-4(2-hydroxyethoxy)phenyl]propane (molar ratio with respect to the dimethylterephthalate 2.3%), 4.5parts of 1-sulphobenzene-3,5-dicarboxylic dimethylester monosodium salt (molar ratio with respect to dimethylterephthalate 1.98), 0.112 parts of manganese acetate, 0.6 parts of titanium dioxide and 0.019 parts of potassium acetate. The ester interchange and the polycondensation stages are carried out in the way described in Example 1. The polymer obtained according tothis example has the following characteristics:

$[\eta]$ = 0.52 dl/g;
acid groups = 38 equivalents/ton;
diethyleneglycol content = 2.5% in mols;
Br% found = 3.4;
S% found = 0.31.

EXAMPLE 3

Preparation of a copolyester from terephthalic acid, ethylene glycol, 2,2-bis [3,3-dibromo-4(2-hydroxyethoxy)phenyl]propane and 1-sulphobenzene-3,5-dicarboxylic monosodium salt, having calculated Br and S contents of 6% and 0.34% respectively.

In the autoclave described in Example 1, the following products are charged: 128 parts of terephthalic acid, 105 parts of ethylene glycol, 20.5 parts of the brominated derivative indicated in Examples 1 and 2 (molar ratio with respect to terephthalic acid 4.2%), 60 parts of 1-sulphobenzene-3,5-dicarboxylic monosodium salt (molar ratio with respect to terephthalic acid 2.4%), 0.6 parts of titanium dioxide. After adding the above substances, the temperature is rapidly brought to 200° C. under stirring; the ester interchange initiates at this temperature with elimination of water. When 90–93% of the theoretical quantity of water has been collected, viz. within 200–215 minutes, the material is transferred into the second autoclave. Here the products indicated in Example 1 are added in the same quantities; the polycondensation continues in the way described in Example 1. The polymer resulting from this preparation has the following characteristics:

$[\eta]$ = 0.49 dl/g
acid groups = 45 equivalents/ton
diethyleneglycol content = 2.1% in mols;
Br% found = 5.9;
S% found = 0.34.

EXAMPLE 4

Preparation of fabric for curtains from a copolyester containing bromine and sulphur derivatives and vertical inflammability test DOC FF 3 -71.

The copolyester prepared as described in Example 1 is spun after drying, into continuous yarn, having a count of 70 denier and 24 filaments. The temperature of the head is 280° C., the spinning speed 680 meters/minute, the yarn is drawn to a ratio 1:3.75 (the temperature of the low speed draw rollers being 85° C., and that of the heater interposed between said rollers and the high speed rollers being 130° C.).

The characteristics of the corresponding yarn are:
Tenacity-3.5 gr/den;
elongation-22.3%;
USTER (index of count uniformity)-1.4;
$[\eta]$ = 0.47 dl/g.

A "veil" type curtain fabric is prepared from said yarn after twisting it (800 twists per meter), by weaving on a shuttle loom.

5 test samples of said curtain fabric (weight 65 g/m²) and 5 test samples of a comparable fabric made from conventional polyethyleneterephthalate having the same count and weight are subjected to the vertical test DOC FF 3-71, which has been rendered more severe by inserting in each test sample three glass yarns. The results of the tests are tabulated hereinafter (tables 1 and 2), and it is noted that to pass the test the following requirements must be met: the length of time during which a sample continues to burn after the igniting flame has been removed (which is called "post-combustion time" and will be designated by the letters "TC") should not be longer than 10 seconds for any sample, the average burnt length (hereinafter indicated as LB) of the five test samples should not be higher than 17.8 cm. and no sample should reach a burnt length of 25.4 cm.

TABLE 1

Curtain fabric from self-extinguishing and flame retardant polyester:

| Test sample N. | 1 | 2 | 3 | 4 | 5 |
|---|---|---|---|---|---|
| LB, cm. | 11 | 12.5 | 11 | 11.5 | 10 |
| Post-combustion time, sec. | 0 | 4 | 4 | 0 | 0 |

Average post-combustion time (average TC), 1.6 sec.
Average LB cm. 11.2.

TABLE 2

Curtain fabric from conventional polyethyleneterephthalate:

| Test sample N. | 1 | 2 | 3 | 4 | 5 |
|---|---|---|---|---|---|
| LB cm. | 25.4 | 10 | 22 | 19.5 | 19.5 |
| TC sec. | 42 | 0 | 18 | 16 | 18 |

Average TC, 17 sec.
Average LB, 19.3 cm.

As the tabulated data show, there is a decisive difference between the self-extinguishing articles prepared according to the invention, and the normal article; in fact, the first clearly meet the required standard, and the second does not. The curtain fabric obtained from self-extinguishing and flame retardant polyester after 10 washings at 60° C. in a washing machine with a detergent, substantially maintains its properties of resistance to the combustion, as measured by test DOC FF 3-71 with the insertion of three glass yarns; which shows that the effect of the self-extinguishing additives is not influenced by repeated washings, as occurs when the self-extinguishing additives are applied to articles in the finishing stage. After the said washings, the articles according to the invention have an average TC of 0.2 sec. and an average LB of 9.4 cm, and still meet the requirements of the test. The results which follow show that the self-extinguishing property is not modified when the curtain fabric is dyed with disperse or cationic dyes. In these cases too the standard of DOC FF 3-71 is met. 5 test samples of the above defined curtain fabric dyed with cationic dye (the dye empoyled was Basacril Blue GL) have an average TC of 2 sec. and an average LB of 11.3 cm. 5 test samples of the same curtain fabric dyed with disperse dye (the dye employed was Palanil blu R) have an average TC of 3 sec. and an average LB of 10.9 cm.

The following results show that the test DOC FF 33-71 is passed also by stocking test samples obtained from texturized yarn made from the aforesaid 70/24 continuous yarn from the copolyester of Example 1. The texturization has been carried out under the following conditions:

| | |
|---|---|
| Spindle turns/minute | 281300 |
| Twists/metre | 3409 |
| Temperature of the setting oven | 150° C. |
| Type of spindle | Bigalet |
| The DOC FF 3-71 test gives the following results: | |
| Average TC, 2.2 sec. - Average LB, 8 cm. | |

EXAMPLE 5

Inflammability test on test samples derived from copolyester yarn obtained according to Example 2.

The polymer obtained according to Example 2 is spun and drawn in the way described in the preceding example. The characteristics of the fibres are the following:

| | |
|---|---|
| Tenacity | 4.1 gr/den; |
| Elongation | 19.2% |
| Count | 70/24. |

A stocking sample is prepared from this fibre, and 10 test samples therefrom are subjected to the test DOC FF 3-71 (3 glass yarns being inserted in each test sample). The test's standard is met: Average TC, 0 sec.- Average LB, 12.3 cm.

Such results show that in spite of the reduced Br and S content in this polyester, the behavior to the test is analogous to that reported in Example 4.

EXAMPLE 6

This example shows the synergic effect of the Br and S compositions in conferring self-extinguishing and flame retardant properties to the copolyester.

The test consists in determining the number of ignitions required for the complete combustion of twines having a length of 50 cm. made of fibres from various copolyesters including a copolyester according to the invention and normal polyethyleneterephthalate. Each twine has been prepared by twisting 100 yarns having a count of 70/24 den (10 twists/cm.).

The individual compositions are the following:

Sample A: copolyethyleneterephthalate yarn containing 0.35% of S (derived from sulphobenzene-1,3-dicarboxylic-dimethylester monosodium salt).

Sample B: normal polyethyleneterephthalate yarn.

Sample C: yarn from copolyethyleneterephthalate containing 5% Br (derived from the brominated compound hereinbefore indicated as component C wherein a and b are both 1).

Sample D: yarn from copolyethyleneterephthalate obtained according to Example 1 containing 0.35% of S and 5% of Br.

Before the test, the twines have been kept in an oven for conditioning for 15 hours at 60° C.; the number of ignitions required for the combustion, tabulated in table 3, is the average of 5 determinations.

TABLE 3

| Sample | Number of ignitions |
|---|---|
| A | 6 |
| B | 10 |
| C | 19 |
| D | 25 |

Since it is noted that the presence of an S compound only (in sample A) renders the behavior of the polyester with regard to combustion worse than in conventional polyethyleneterephthalate (Sample B), it would have been expected that sample D which contains both bromine and sulphur would be less flame resistant than sample C which contains bromine only, viz. that sample D would show a number of ignitions between 10 and 19, if there had been no synergic effect between Br and S. The fact that 25 ignitions were found instead, constitutes unequivocal proof that the concurrent presence of components containing Br and S produce a synergic effect when the polyethyleneterephthalates modified according to the present invention, or articles made therefrom, are subjected to combustion.

We claim:

1. Process for making a copolyester composition which comprises polycondensing, in the presence of a polycondensation catalyst, the following components:

(A) a compound selected from the group consisting of dicarboxylic arylic acids and their methyl diesters;

(B) a saturated aliphatic diol;

(C) a tetrabrominated diol having the formula (1)

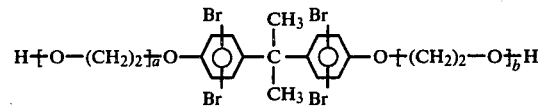

wherein a and b are, independently of one another, 1 or 2;

(D) a compound having the formula (2)

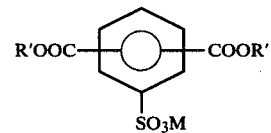

wherein R' is selected from the group consisting of hydrogen, alkyl containing from 1 to 3 carbon atoms and hydroxyalkyl containing 2 or 3 carbon atoms, and M is an alkali metal; and (E) a positive amount of up to 1% by weight of a phosphor derivative selected from the group consisting of organic and inorganic derivatives of trivalent or pentavalent phosphor, as complexing and stabilizing agent.

2. Process according to claim 1, wherein the catalyst is selected from the group consisting of $Sb_2O_3$ and $GeO_2$.

3. Process according to claim 1, wherein the polycondensation is continued until the intrinsic viscosity of the resulting composition is between 0.3 and 0.6 dl/g, measured at 20° C. in a 60/40 by weight phenol/tetrachloroethane mixture.

4. Process according to claim 1, wherein the saturated aliphatic diol has the formula (3)

$$HO \mbox{--} (CH_2)_c \mbox{--} O \mbox{--}_d H$$

wherein c is a whole number between 2 and 4 and d is 1 or 2.

5. Process according to claim 1, wherein the alkali metal M is selected from the group consisting of Na and K.

6. Process according to claim 1, wherein R' in the compound having the formula (2) is selected from the group consisting of $CH_3$ and $CH_2CH_2OH$.

7. Process according to claim 1, the polycondensation is carried out with the following molar ratios of the components: one mol of component A, 1 to 2.5 mols of component B, from 0.001 to 0.1 mol of component C and from 0.005 to 0.07 mol of component D.

8. Process according to claim 1, wherein phosphor derivative is selected from the group consisting of phosphorous, phosphoric acids, their salts, and their aliphatic or aromatic esters.

9. Copolyester composition, characterized in that it is constituted by the random association of the radicals of the following components:

(A) a compound selected from the group consisting of dicarboxylic arylic acids and their methyl diesters;

(B) a saturated aliphatic diol;

(C) a tetrabrominated diol having the formula (1)

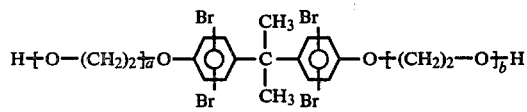

wherein a and b are, independently of one another, 1 or 2;

(D) a compound having the formula (2)

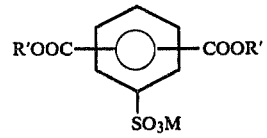

wherein R' is selected from the group consisting of hydrogen, alkyl containing from 1 to 3 carbon atoms and hydroxyalkyl containing 2 or 3 carbon atoms, and M is an alkali metal; and (E) a positive amount of up to 1% by weight of a phosphor derivative selected from the group consisting of organic and inorganic derivatives of trivalent or pentavalent phosphor, as complexing and stabilizing agent.

10. Composition according to claim 9, wherein the dicarboxylic arylic acid is terephthalic acid and the saturated aliphatic diol is selected from the group consisting of ethylene glycol and butylene glycol.

11. Composition according to claim 9, which has an intrinsic viscosity of at least 0.40 dl/g, measured at 20° C. in a 60/40 by weight mixture of phenol and tetrachloroethane.

12. Composition according to claim 11, which has an intrinsic viscosity of at least 0.45 dl/g.

13. Composition according to claim 9, which contains between 0.1 and 12% by weight of bromine and between 0.05 and 1% by weight of sulphur.

14. A formed body composed of the copolyester composition according to claim 9.

15. A formed body according to claim 14, wherein the composition has an intrinsic viscosity of at least 0.35 dl/g, measured at 20° C. in a 60/40 by weight mixture of phenol and tetrachloroethane.

16. A formed body according to claim 15, wherein the intrinsic viscosity of the composition is at least 0.40 dl/g.

17. A formed body according to claim 14, which is a filament or fiber.

18. Process according to claim 1, wherein the phosphor derivative is selected from the group consisting of phosphoric acid, an alkali metal salt of phosphoric acid, triphenyl phosphate, triphenyl phosphite, triethyl phosphate and triethyl phosphite.

19. Composition according to claim 9, wherein the phosphor derivative is selected from the group consisting of phosphoric acid, an alkali metal salt of phosphoric acid, triphenyl phosphate, triphenyl phosphite, triethyl phosphate and triethyl phosphite.

* * * * *